United States Patent
Hinch et al.

(10) Patent No.: US 11,465,341 B2
(45) Date of Patent: Oct. 11, 2022

(54) 3-DIMENSIONAL PRINTED PARTS

(71) Applicant: Hewlett-Packard Development Company, L.P., Houston, TX (US)

(72) Inventors: Garry Hinch, Corvallis, OR (US); Kevin P. DeKam, Corvallis, OR (US); Sterling Chaffins, Corvallis, OR (US); James William Stasiak, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 910 days.

(21) Appl. No.: 16/073,222

(22) PCT Filed: Apr. 28, 2016

(86) PCT No.: PCT/US2016/029857
§ 371 (c)(1),
(2) Date: Jul. 26, 2018

(87) PCT Pub. No.: WO2017/188963
PCT Pub. Date: Nov. 2, 2017

(65) Prior Publication Data
US 2019/0022930 A1 Jan. 24, 2019

(51) Int. Cl.
*B29C 64/165* (2017.01)
*B33Y 70/00* (2020.01)
(Continued)

(52) U.S. Cl.
CPC ............ *B29C 64/165* (2017.08); *B29C 67/00* (2013.01); *B33Y 10/00* (2014.12); *B33Y 30/00* (2014.12);
(Continued)

(58) Field of Classification Search
CPC .............................. B33Y 70/10; B29C 64/165
See application file for complete search history.

(56) References Cited

U.S. PATENT DOCUMENTS 5,351,151 A 9/1994 Levy
5,993,854 A 11/1999 Needleman et al.
(Continued)

FOREIGN PATENT DOCUMENTS

CN 1950192 4/2007
CN 101019059 8/2007
(Continued)

OTHER PUBLICATIONS

Zhou. The broad emission at 785 nm in YAG:Ce 3+ ,Cr 3+ phosphor. Sep. 2017Spectrochimica Acta Part A Molecular and Biomolecular Spectroscopy 190 (Year: 2017).*
(Continued)

*Primary Examiner* — Matthew E. Hoban
(74) *Attorney, Agent, or Firm* — HPI Patent Department

(57) ABSTRACT

A 3-dimensional printed part can include a part body including a first matrix of fusing agent and thermoplastic polymer powder, a security feature including a second matrix of fusing agent, thermoplastic polymer powder, and photoluminescent agent, and a masking feature including a third matrix of fusing agent and thermoplastic polymer powder. The security feature can be positioned beneath and visible through the masking feature upon photoluminescent emission of the security feature.

12 Claims, 5 Drawing Sheets

(51) Int. Cl.
*B33Y 10/00* (2015.01)
*B33Y 30/00* (2015.01)
*B29C 67/00* (2017.01)

(52) U.S. Cl.
CPC ...... *B33Y 70/00* (2014.12); *B29K 2995/0018* (2013.01)

(56) References Cited

U.S. PATENT DOCUMENTS

| | | | |
|---|---|---|---|
| 6,363,606 | B1 | 4/2002 | Johnson et al. |
| 6,589,471 | B1 | 7/2003 | Khoshnevis |
| 6,599,444 | B2 | 7/2003 | Burnell-Jones |
| 7,365,129 | B2 | 4/2008 | Kramer et al. |
| 7,919,018 | B2 | 4/2011 | Williams et al. |
| 7,972,426 | B2 | 7/2011 | Hinch et al. |
| 8,623,951 | B2 | 1/2014 | Kambe |
| 9,281,186 | B2 | 3/2016 | Wooton |
| 9,313,360 | B2 | 4/2016 | Morovic et al. |
| 10,375,765 | B2 | 8/2019 | Chaffins et al. |
| 2004/0126567 | A1 | 7/2004 | Dimond et al. |
| 2004/0137228 | A1 | 7/2004 | Monsheimer et al. |
| 2005/0003189 | A1 | 1/2005 | Bredt et al. |
| 2005/0042453 | A1 | 2/2005 | James et al. |
| 2005/0072113 | A1* | 4/2005 | Collins .............. B29C 64/40 52/782.1 |
| 2005/0105191 | A1 | 5/2005 | Baer et al. |
| 2005/0057245 | A1 | 6/2005 | Eric et al. |
| 2006/0046093 | A1 | 3/2006 | Landry et al. |
| 2006/0290032 | A1 | 12/2006 | Sano |
| 2007/0183918 | A1 | 8/2007 | Monsheimer et al. |
| 2007/0238056 | A1 | 10/2007 | Baumann et al. |
| 2007/0241482 | A1 | 10/2007 | Giller et al. |
| 2008/0122141 | A1* | 5/2008 | Bedal .................. C08J 5/00 264/405 |
| 2008/0149164 | A1 | 6/2008 | Goedmakers et al. |
| 2008/0192074 | A1 | 8/2008 | Dubois et al. |
| 2009/0004381 | A1 | 1/2009 | Fujisawa et al. |
| 2009/0215209 | A1 | 8/2009 | Anc et al. |
| 2009/0256273 | A1 | 10/2009 | Yu |
| 2010/0032935 | A1* | 2/2010 | Heer .................. B41M 3/144 283/92 |
| 2010/0140550 | A1 | 6/2010 | Keller et al. |
| 2011/0049865 | A1 | 3/2011 | Bray |
| 2011/0217544 | A1 | 9/2011 | Young et al. |
| 2012/0106437 | A1 | 5/2012 | Seo et al. |
| 2012/0130530 | A1 | 5/2012 | Yasukochi |
| 2012/0202022 | A1 | 8/2012 | Schulze |
| 2014/0261031 | A1 | 9/2014 | Kellar et al. |
| 2014/0263667 | A1 | 9/2014 | Mege |
| 2014/0263674 | A1 | 9/2014 | Cerveny |
| 2014/0275317 | A1 | 9/2014 | Moussa |
| 2015/0235069 | A1 | 8/2015 | Kumar et al. |
| 2015/0258770 | A1 | 9/2015 | Chan et al. |
| 2015/0291921 | A1 | 10/2015 | Rives et al. |
| 2015/0343673 | A1 | 12/2015 | Williams |
| 2015/0361286 | A1 | 12/2015 | Williams |
| 2016/0054474 | A1 | 2/2016 | Harmon |
| 2016/0067659 | A1 | 3/2016 | Williams |
| 2016/0167299 | A1 | 6/2016 | Jallouli et al. |
| 2016/0229119 | A1 | 8/2016 | Renn et al. |
| 2016/0257071 | A1 | 9/2016 | Okamoto |
| 2016/0322703 | A1 | 11/2016 | Jesme et al. |
| 2016/0339636 | A1 | 11/2016 | De et al. |
| 2017/0028618 | A1 | 2/2017 | Robeson et al. |
| 2017/0225396 | A1 | 8/2017 | Tom et al. |
| 2017/0239889 | A1 | 8/2017 | Ganapathiappan et al. |
| 2017/0247552 | A1 | 8/2017 | Prasad et al. |
| 2017/0247553 | A1 | 8/2017 | Ganapathiappan et al. |
| 2018/0015663 | A1 | 1/2018 | Zhao |
| 2019/0137664 | A1 | 5/2019 | Stasiak |

FOREIGN PATENT DOCUMENTS

| | | |
|---|---|---|
| CN | 01102905 | 1/2008 |
| CN | 101556345 | 10/2009 |
| CN | 101870218 | 1/2010 |
| CN | 101819647 | 9/2010 |
| CN | 1976799 | 4/2012 |
| CN | 103755889 | 4/2014 |
| CN | 103991217 | 8/2014 |
| CN | 104149350 | 11/2014 |
| CN | 105346089 | 2/2016 |
| CN | 105392618 | 3/2016 |
| CN | 204036857 U | 12/2016 |
| EP | 04771453.0 | 8/2004 |
| EP | 2952360 | 12/2015 |
| EP | 2969482 | 1/2016 |
| JP | H049099203 | 3/1992 |
| JP | H08156393 | 6/1996 |
| JP | 2000234104 | 8/2000 |
| JP | 2003504109 | 2/2003 |
| JP | 2005254534 | 9/2005 |
| JP | 2006274077 | 10/2006 |
| JP | 2007-100062 A | 4/2007 |
| JP | 2007529340 | 10/2007 |
| JP | 2007534524 | 11/2007 |
| JP | 2009298146 | 12/2009 |
| JP | 2010001425 | 1/2010 |
| JP | 2011129787 | 6/2011 |
| JP | 2012-106437 A | 6/2012 |
| JP | 2015112836 | 6/2015 |
| JP | 2015-171781 A | 10/2015 |
| JP | 2015174426 | 10/2015 |
| JP | 2015221526 | 12/2015 |
| JP | 2017057467 | 3/2017 |
| JP | 2017510475 | 4/2017 |
| KR | 20140069021 | 6/2014 |
| WO | WO-2000041673 | 7/2000 |
| WO | WO-200138061 A1 | 5/2001 |
| WO | WO-2004063295 | 7/2004 |
| WO | 2005/057245 A2 | 6/2005 |
| WO | WO-2005090055 | 9/2005 |
| WO | WO-2014076049 | 5/2014 |
| WO | 2015/056232 A1 | 4/2015 |
| WO | WO-2015063399 | 5/2015 |
| WO | WO-2015102938 | 7/2015 |
| WO | WO-2015106816 A1 | 7/2015 |
| WO | WO-2015164234 A1 | 10/2015 |
| WO | WO-2015164234 A1 | 10/2015 |
| WO | WO-2015167530 | 11/2015 |
| WO | WO-2016048380 A1 | 3/2016 |
| WO | WO-2016048975 | 3/2016 |
| WO | WO-2016053248 | 4/2016 |
| WO | WO-2017188961 | 4/2016 |
| WO | WO-2016175817 | 11/2016 |
| WO | WO-2017188963 | 11/2017 |
| WO | WO-2018022051 | 2/2018 |

OTHER PUBLICATIONS

Additive manufacturing of graded dielectrics.
Casey Check et al.—Inkjet printing of 3D nano-composites formed by photopolymerization of an acrylate monomer—Copyright ©2015 Published by Elsevier B.V., 2 pages.
Doubrovski, E.L. et al., Voxel-based fabrication through material property mapping: A design method for bitmap printing, Mar. 2015, 3 pages.
Golembiewski, K., At Rapid, HP Shows Production-Ready 3D Printing System, May 17, 2016, 3 pages.
HP Delivers World's First Production-Ready 3D Printing System, May 17, 2016, 3 pages.
PRIMIR—Emerging Printing Technologies & Applications—Pivotal Resources, 2014, 2 pages.
Siemens to Collaborate with HP Inc. to Elevate 3D Printing from Prototyping to Full Production, May 17, 2016, 2 pages.
Tang Jinfa, "Thin Film Optics and Technology", Jun. 30, 1989, pp. 153-155,China Machine Press.

* cited by examiner

3-DIMENSIONAL PRINTED PARTS

BACKGROUND

Methods of 3-dimensional (3D) digital printing, a type of additive manufacturing, have continued to be developed over the last few decades. Various methods for 3D printing have been developed, including heat-assisted extrusion, selective laser sintering, photolithography, powder bed printing, as well as others. In general, 3D printing technology improves the product development cycle by allowing rapid creation of prototype models for reviewing and testing.

Figure 1:
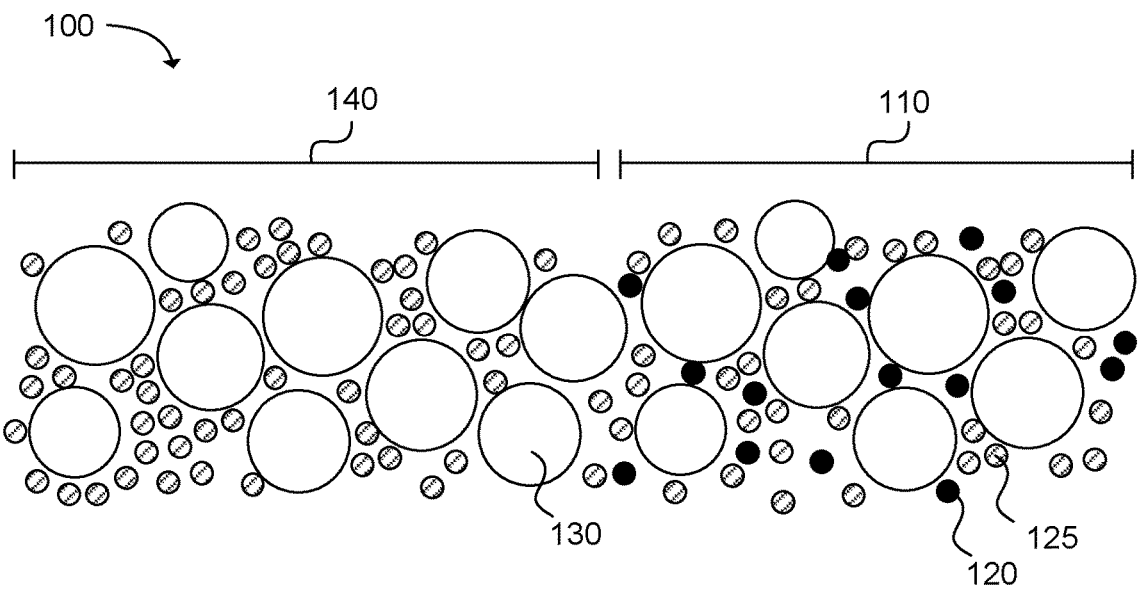
FIG. 1 is a close-up side cross-sectional view of a subsurface particle layer of thermoplastic polymer powder with a photoluminescent ink printed on a portion of the layer in accordance with examples of the present disclosure.

The figures depict several examples of the presently disclosed technology. However, it should be understood that the present technology is not limited to the examples depicted.

DETAILED DESCRIPTION

The present disclosure is drawn to the area of 3-dimensional printing. More specifically, the present disclosure provides 3-dimensional printed parts, methods of making 3-dimensional printed parts, and systems for printing 3-dimensional parts with photoluminescent features printed beneath a surface thereof.

A 3-dimensional printed part can include a part body including a first matrix of fusing agent and thermoplastic polymer powder, a security feature including a second matrix of fusing agent, thermoplastic polymer powder, and photoluminescent agent, and a masking feature including a third matrix of fusing agent and thermoplastic polymer powder. The security feature can be positioned beneath and visible through the masking feature. In one example, the third matrix may have a lower concentration of fusing agent than the first matrix. In another example, the security feature may be encapsulated between the part body and the masking feature, and the masking feature may form a portion of an exterior surface of the 3-dimensional printed part through which a photoluminescent emission of the security feature is visible.

In various examples herein, including a method of making a 3-dimensional printed part and a system for 3-dimensional printing, such examples can also be relevant and can be related to the disclosure described with respect to the 3-dimensional printed part. Thus, general discussion related to any of these examples can be likewise relevant to the other examples. For example, the thermoplastic polymer powder for the printed part, the method, and the system can be a nylon, a thermoplastic elastomer, a urethane, a polycarbonate, a polystyrene, or a combination thereof. The photoluminescent agent can include a photoluminescent pigment, a photoluminescent dye, a quantum dot, or a combination thereof; or likewise, the photoluminescent agent can include a fluorescein dye, rhodamine B, or a combination thereof. In other examples, the security feature can absorb electromagnetic radiation at a wavelength less than 302 nm or greater than 700 nm and to have a photoluminescent emission at a wavelength from 302 nm to 700 nm. In other examples, the security feature can be printed at a depth of from 20 μm to 150 μm from the exterior surface of the 3-dimensional printed part, e.g., beneath the masking feature. In another example, the fusing agent can be a carbon black, a near-infrared absorbing dye, a near-infrared absorbing pigment, a tungsten bronze, a molybdenum bronze, metal nanoparticles, a conjugated polymer, or a combination thereof. Furthermore, the masking feature can be prepared using a reduced drop volume of fusing ink applied at the masking area to allow the security feature to be more easily seen therethrough, e.g., from 30% to 70% of the drop volume applied to similar subsurface layers. In another example, the masking area or feature can have a thickness of from 20 μm to 150 μm.

With this overview in mind, 3-dimensional printed parts, methods of preparing 3-dimensional printed parts, and 3-dimensional printing systems are described herein in greater detail. With these examples, a thin layer of polymer powder can be spread on a bed to form a powder bed. A printing head, such as an inkjet print head, can then be used to print a fusing ink over portions of the powder bed corresponding to a thin layer of the three dimensional object to be formed. Then the bed can be exposed to a light source, e.g., typically the entire bed. The fusing ink absorbs more energy from the light than the unprinted powder. The absorbed light energy can be converted to thermal energy, causing the printed portions of the powder to melt and coalesce. This forms a solid layer. After the first layer is formed, a new thin layer of polymer powder can be spread over the powder bed and the process can be repeated to form additional layers until a complete 3-dimensional part is printed. Such 3-dimensional printing processes can achieve fast throughput with good accuracy.

Figure 2:
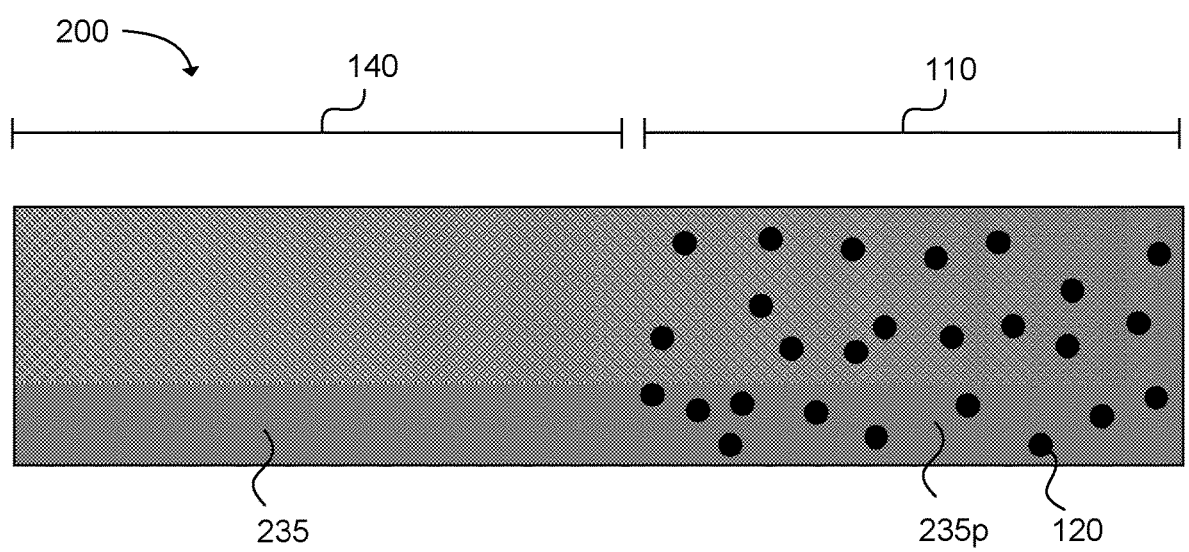
FIG. 2 is a close-up side cross-sectional view of the layer of FIG. 1 after the layer has been cured in accordance with examples of the present disclosure.

This same general process can be implemented to print a 3-dimensional printed part having a subsurface security feature, as will be illustrated in FIGS. 1-4. FIG. 1 shows the subsurface particle layer 100 after being printed but before being cured, and FIG. 2 shows the subsurface fused layer 200 after being cured. In FIG. 1, a security area 110 of the subsurface particle layer has been printed with a photoluminescent ink which includes a photoluminescent agent 120 co-dispensed with a fusing ink which includes a fusing agent 125 to form the subsurface fused layer. The photoluminescent agent penetrates into the spaces between the powder particles 130. A non-security area 140 of the subsurface particle layer has been printed with a fusing ink including a fusing agent, but without photoluminescent ink. Thus, as shown, only a portion of the printed part includes the photoluminescent agent.

As shown in FIG. 2, a subsurface fused layer 200 has been cured by exposure to electromagnetic radiation to form a fused layer including a first matrix 235 including fusing agent from the fusing ink and thermoplastic polymer powder. In another portion, the photoluminescent agent 120 can be dispersed and entrapped within the security area 110 of the fused layer as a second matrix 235p to form a security feature. It should be noted that FIGS. 1 and 2 show only a 2-dimensional cross-section of a single subsurface particle layer. Other layers may exist above and below this layer. Further, it is noted that the photoluminescent agent is illustrated in FIGS. 1 and 2 as completely penetrating the layer of thermoplastic polymer powder. However, this is not necessarily the case in certain examples of the present disclosure. In some examples, the photoluminescent agent can extend into the subsurface particle layer up to 20%, up to 50%, up to 70%, up to 90%, or at 100% of the thickness of the layer.

In further detail, when photoluminescent ink is printed onto a layer of the thermoplastic polymer powder, the photoluminescent ink can penetrate into the spaces between powder particles. The fusing ink or a second fusing ink can also be printed onto the layer in the same areas as the photoluminescent ink. The layer can then be cured by exposing the layer to electromagnetic radiation. In some examples, the photoluminescent ink can include the fusing agent or a second fusing agent. Thus, in some examples, the photoluminescent ink can be a fusing ink. In other examples, the photoluminescent ink can be printed with a separate fusing ink and/or a second fusing ink to facilitate fusing of the thermoplastic polymer. In either scenario, the temperature of the powder can be raised above the melting or softening point of the thermoplastic polymer so as to facilitate the fusing process.

Figure 3:
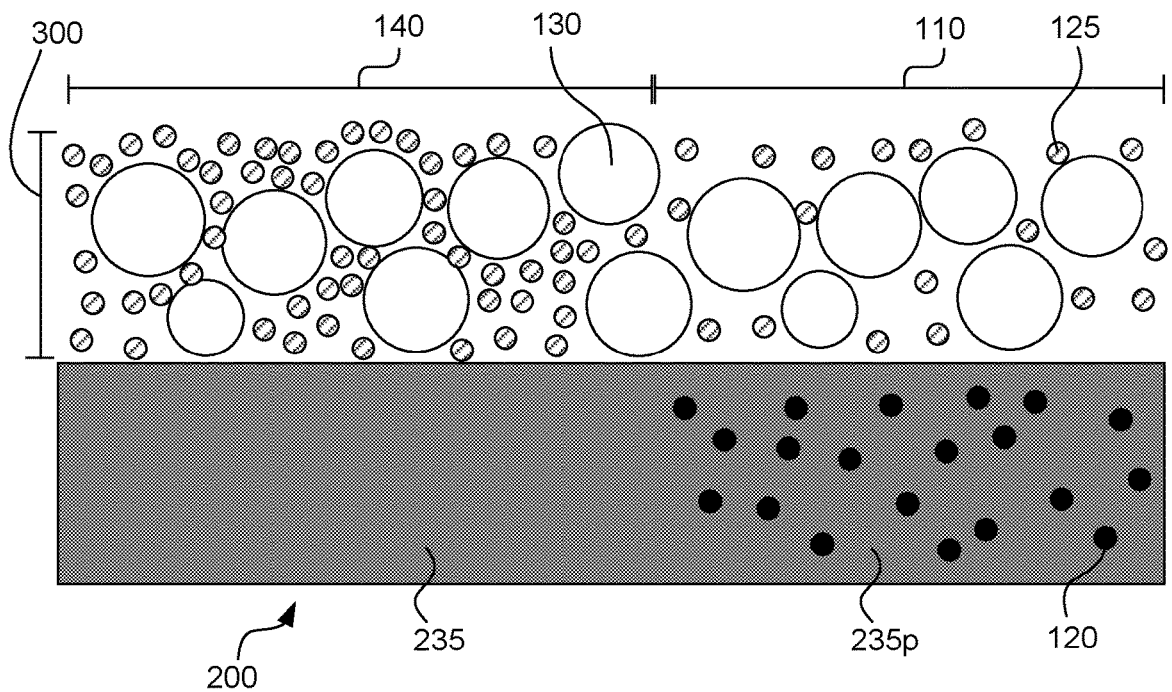
FIG. 3 is a close-up side cross-sectional view of a surface particle layer of thermoplastic polymer powder with a reduced drop volume of fusing ink printed on a portion of the layer to form a masking area or feature in accordance with examples of the present disclosure.

In accordance with examples of the present disclosure, a surface particle layer can then be distributed on a subsurface fused layer to mask or partially mask the security feature printed therein, and in either case, protect the security feature. A representation of a surface particle layer applied to a fused subsurface layer with a security feature therein is illustrated in FIG. 3. More specifically, FIG. 3 shows a surface particle layer 300 with powder particles 130 applied to a subsurface fused layer 200, such as that described in FIG. 2. The surface particle layer in FIG. 3 is shown in a condition after being printed with fusing agent but before being cured. There, a masking area 110 of the surface particle layer 300 has been printed with a reduced drop volume of fusing ink as compared to the drop volume applied to the subsurface particle layer and/or the non-masking area 140 of the surface particle layer. As a result, the masking area has a reduced amount of fusing agent 125 compared to the non-masking area. Thus, only a portion of the surface particle layer provides the masking area in this example, which can be aligned with, overlap with, or correspond to the security feature in the subsurface fused layer, which in this case can be provided by the photoluminescent agent 120 at subsurface fused layer or second matrix 235p. Subsurface fused layer at a first matrix 235 does not include any photoluminsescent agent, so in this example, the area above portion 235 does not include a reduced drop volume of fusing ink as there is nothing to mask at this location. In this example, this portion of the fused surface layer can be similar to the second matrix composition. However, it is noted that the entire surface fused layer can be prepared with the same fusing ink drop volume, provided it is printed at a light enough drop volume to mask the photoluminescent agent, but not completely obscure it from being viewed therethrough (e.g., translucent) as a hidden or partially masked feature, for example. It should be noted that "drop volume," as used herein, refers to an amount of ink printed to a given area. This can be accomplished by adjusting the drop weight of a single drop of ink printed to a given area and/or by adjusting the number of drops applied to a given area. In some examples, the drop volume in the masking area can be from about 30% to about 70%, about 40% to about 60% or about 45% to about 55% of the drop volume applied to the subsurface particle layer and/or to a non-masking area of the surface particle layer.

Figure 4:
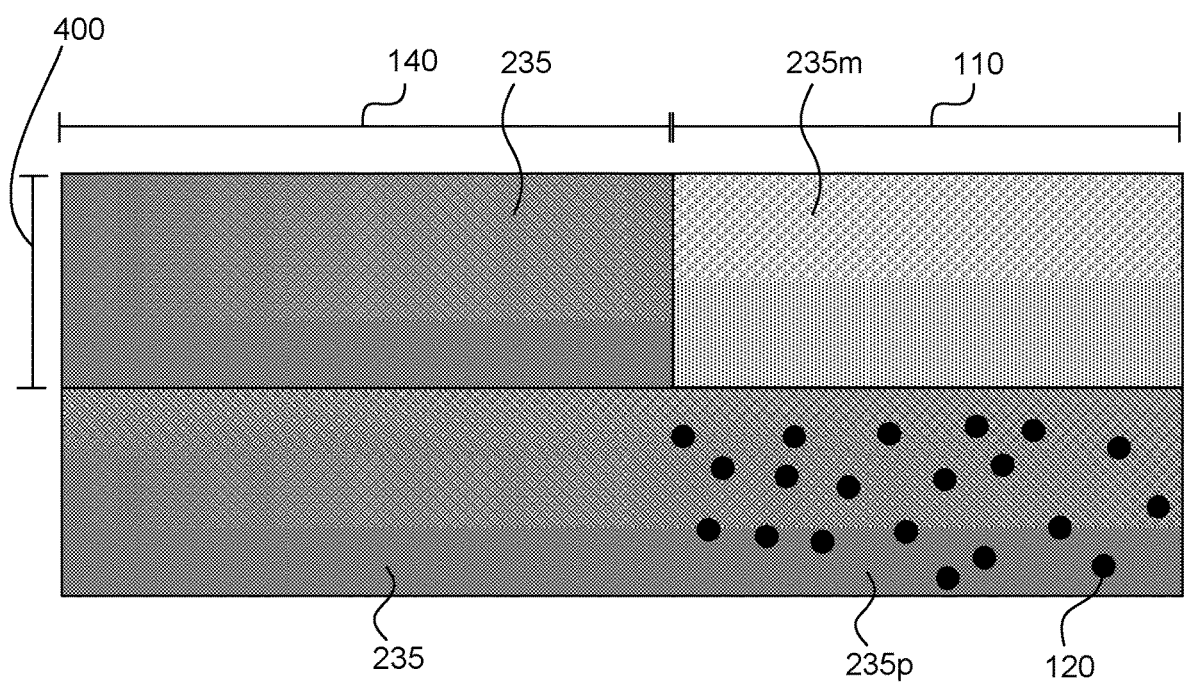
FIG. 4 is a close-up side cross-sectional view of the layer of FIG. 3 after the layer has been cured in accordance with examples of the present disclosure.

As shown in FIG. 4, a surface fused layer 400 is shown after being cured by exposure to electromagnetic radiation. The fused subsurface layer, which includes the first matrix 235 (without photoluminescent agent) and the second matrix 235p (with photoluminescent agent) can be thus protected by this new surface layer. However, as a portion of the fused subsurface layer, the second matrix 235p, includes photoluminescent agent that can be visible through the surface fused layer, notably the fused surface layer in this example includes a masking area 110 and a non-masking area 140. The masking area includes first matrix 235, which can be similar to the first matrix of the subsurface fused layer, and a third matrix 235m, which includes a lower concentration of fusing agent than other areas at the surface. Thus, the surface fused layer can provide an area of decreased opacity or decreased attenuation of electromagnetic radiation in the 3-dimensional printed part. Thus, a photoluminescent emission of a security feature printed in a subsurface fused layer can be visible through the masking area. The non-masking area can include a second portion 235 of the surface fused layer that is prepared similarly to the subsurface fused layer, as there is no photoluminescent material therebeneath that is to be viewed through the surface layer at this location. Thus, a photoluminescent emission of a security feature printed in a subsurface fused layer can be visible through the masking area. It should be noted that FIGS. 1-4 show only a 2-dimensional cross-section of certain specific layers of a 3-dimensional part. Portions of the part body that can exist beneath these layers are not shown. Furthermore, fused layers shown at non-masking area 140 in this example do not provide any photoluminescent properties or masking properties as described herein, so these portions of the 3-dimensional printed part can be considered to be a portion of the part body. Further, it is noted that FIGS. 1-4 are not necessarily drawn to scale, and the relative sizes of powder particles and photoluminescent agent particles can differ from those shown. Further, the photoluminescent agent need not be in the form of particles.

The thickness of the surface particle layer or layers can affect the visibility of a photoluminescent emission. Sufficient photoluminescence in the subsurface particle layer can be achieved by dispensing a sufficient amount of photoluminescent agent onto the powder bed. In some examples, a sufficient mass of photoluminescent agent per volume of the subsurface particle layer can be used to achieve sufficient photoluminescence. For example, the mass of photoluminescent agent per volume of subsurface particle layer can be greater than 0.1 mg/cm$^3$, greater than 1 mg/cm$^3$, greater than 10 mg/cm$^3$, greater than 50 mg/cm$^3$, or greater than 100 mg/cm$^3$. In a particular example, the mass of photoluminescent agent per volume of the subsurface particle layer can be greater than 140 mg/cm$^3$. In further examples, the mass of photoluminescent agent per volume of the subsurface particle layer can be from 1 mg/cm$^3$ to 1000 mg/cm$^3$, from 10 mg/cm$^3$ to 1000 mg/cm$^3$, from 50 mg/cm$^3$ to 500 mg/cm$^3$, or from 100 mg/cm$^3$ to 500 mg/cm$^3$.

In some examples, the amount of photoluminescent agent dispensed onto the powder bed can be adjusted by printing the photoluminescent ink in multiple passes. In one example, a single pass of an inkjet printhead can be sufficient to dispense enough photoluminescent agent to achieve adequate photoluminescence of the security feature printed in the subsurface particle layer. However, in some cases, a single pass may not be sufficient to achieve adequate photoluminescence. Additional passes can be applied to increase the amount of photoluminescent agent in the security feature printed in the subsurface particle layer. In one non-limiting example, a plurality of passes (e.g. two, three, four, etc.) can be used to achieve adequate photoluminescence. In further examples, the amount of photoluminescent agent dispensed can be adjusted by adjusting the drop weight of the inkjet printhead either through resistor design or by changing firing parameters. Thus, with a greater drop weight, a greater amount of the photoluminescent ink can be printed with each drop fired. However, in some cases jetting too large an amount of ink in a single pass can lead to lower print quality because of ink spreading. Therefore, in some examples multiple passes can be used to print more of the photoluminescent ink with better print quality.

In some examples, the security feature printed with the photoluminescent ink can be encapsulated between the part body and the masking feature of the 3-dimensional printed part. Further, the matrix of fused thermoplastic polymer powder of the part body can be continuous with the matrix of fused thermoplastic polymer powder of the security feature and the masking feature. The masking feature can form a portion of an exterior surface of the 3-dimensinoal printed part through which a photoluminescent emission of the security feature can be visible.

The 3-dimensional printed part can be formed of multiple layers of fused thermoplastic polymer powder stacked in a z-axis direction. The z-axis refers to the axis orthogonal to the x-y plane. For example, in 3-dimensional printing systems having a powder bed floor that lowers after each layer is printed, the z-axis is the direction in which the floor is lowered. In some examples, the security feature can be oriented completely or partially in the z-axis direction. As one specific example, the security feature can be formed below a surface of the 3-dimensional printed part that is oriented in the x- and/or y-axis direction and the z-axis direction. 3-dimensional printed parts having such surfaces can include pyramid shapes, spherical shapes, trapezoidal shapes, non-standard shapes, etc. The photoluminescent security feature can be formed below any number of these surfaces and oriented parallel to or similarly to these surfaces such that the photoluminescent security feature can be oriented completely or partially in the z-axis direction. Thus, the photoluminescent security feature can be formed of a single layer of thermoplastic polymer powder or can be formed of multiple additive layers of thermoplastic polymer powder, depending on the position, orientation, desired thickness, etc. of the security feature within the 3-dimensional printed part.

Similarly, the surface layer including the masking area or feature does not necessarily refer to a single layer of thermoplastic polymer powder. Further, as indicated above, the surface layer can also be formed completely or partially in the z-axis direction. For example, the masking feature can be formed of a plurality of layers of thermoplastic polymer powder. In some examples, the surface layer including the masking area or feature can include any surface of the 3-dimensional printed part extending to a depth of from about 20 μm to about 150 μm, or from about 50 μm to about 120 μm within the 3-dimensional printed part, whether it was formed from a single layer of dispersed thermoplastic polymer powder or multiple additive layers of thermoplastic polymer powder. Thus, in some examples, the masking feature can have a thickness of from about 20 μm to about 150 μm, or from about 50 μm to about 120 μm. However, it is noted that the surface layer including the masking feature can be adjacent to the subsurface layer including the security feature, such that a photoluminescent emission of the security feature can be visible through the masking feature.

Figure 5:
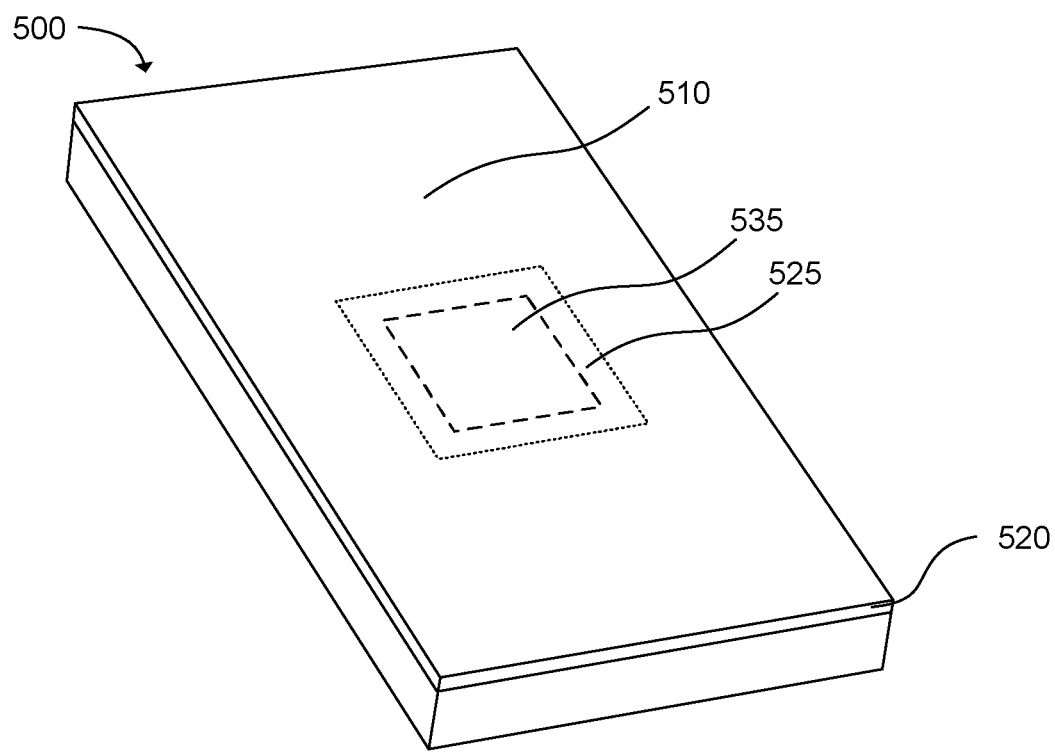
FIG. 5 is a perspective view of a 3-dimensional printed part having a fused surface layer including a masking area or feature in accordance with examples of the present disclosure.

FIG. 5 shows an example of a 3-dimensional printed part 500 that includes a part body 510 and a fused surface layer 520 including a masking feature 525 just above a security feature 535, which was previously applied beneath the surface layer in an area corresponding to the masking feature. In this instance, the masking feature is slightly larger in area than the security feature, but they can be about the same size, or the masking feature may even be smaller than the security feature in some examples. In some examples, the entire fused surface layer can be the masking feature. It is noted that the illustrated 3-dimensional printed part can be printed in a number of orientations, such as with the masking feature and corresponding security feature facing up, facing sideways, etc. It is also noted that, in some examples, the security feature can be invisible or relatively unobservable through the masking feature under ambient lighting conditions and can be completely invisible through other areas of the part body.

The photoluminescent agent printed in the security feature can be tuned such that it does not absorb electromagnetic radiation in the visible range. In some specific examples, the security feature can absorb electromagnetic radiation at a wavelength less than about 302 nm or about 390 nm and can photoluminesce at a wavelength between about 302 nm to about 700 nm, or about 390 nm to about 700 nm. In other examples, the security feature can absorb electromagnetic radiation at a wavelength greater than 700 nm and can photoluminesce at a wavelength between about 302 nm to about 700 nm, or about 390 nm to about 700 nm. In yet other examples, the security feature can both absorb electromagnetic radiation and photoluminesce at wavelengths between 302 nm and 700 nm. In other examples, the security feature can both absorb electromagnetic radiation and photoluminesce at wavelengths within the visible range (e.g., from about 380 nm or about 390 nm to about 700 nm or about 750 nm). In some examples, in addition to being printed beneath the surface of the 3-dimensional printed part, the security feature can be further masked by printing it with similarly colored non-photoluminescent colorants, rendering the photoluminescent agent indistinguishable from the non-photoluminescent colorants until irradiated with photoexciting electromagnetic radiation. As non-limiting examples, fluorescein can be printed with other similar yellow colorants, or rhodamine B can be printed with other similar magenta colorants to mask these photoluminescent agents until irradiated with photoexciting electromagnetic radiation. Upon photoexcitation, the printed pattern of the fluorescein or rhodamine B can become clearly distinguishable from the surrounding colorants.

It is noted that the photoluminescence of the security feature can be affected by the type and amount photoluminescent agent present in the security feature, as well as the type and amount of fusing ink or other inks, and the type and amount of thermoplastic polymer present relative to the photoluminescent agent. Thus, the security feature can have different photoluminescent properties than the photoluminescent agent alone.

Figure 6:
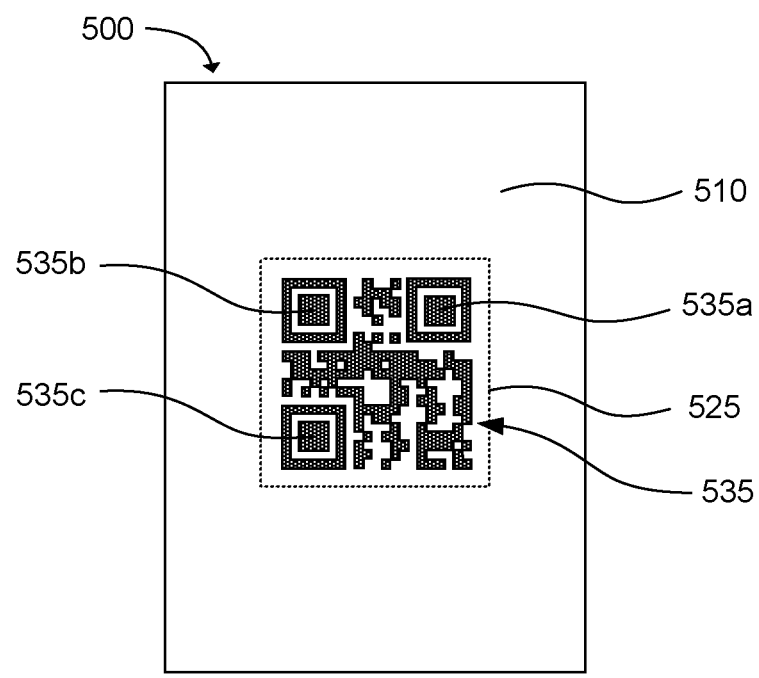
FIG. 6 is a top plan view of the 3-dimensional printed part of FIG. 5 where a security feature printed beneath the surface particle layer is in a photoluminescent state and thus visible through the masking area or feature in accordance with examples of the present disclosure.

As illustrated in FIG. 6, and in further detail with respect to that shown in FIG. 5, once the security feature 535 of 3-dimensional printed part 500 is irradiated with a photoexciting wavelength of electromagnetic radiation, a photoluminescent emission thereof can be visible through the masking feature 525 of the part body 510. In this particular example, the security feature photoluminesces to reveal a QR code through the masking feature. In alternative examples, the security feature can photoluminesce to reveal a bar code, a serial number, a trademark, a tradename, instructions, other words, the like, or a combination thereof.

Further, features 535a, 535b, and 535c can each be printed to have different photoluminescent features. For example, these features can be printed with photoluminescent agents that photoexcite at different wavelengths of electromagnetic radiation, with different amounts of photoluminescent agent to provide different photoluminescent intensities, with different mixtures of photoluminescent agents, etc., or a combination thereof. This can provide additional information encoded in the spatial attributes of the security feature that may only be readable during specific photoluminescent events. The same concept can also be employed with bar codes and other identifying or serialization information. Thus, photoluminescent inks can provide increased information payloads for printed security and serialization features.

The 3-dimensional printed parts described herein can be made from a variety of materials, such as thermoplastic polymer powder, fusing inks, photoluminescent inks, colorants, and the like, in various combinations. More specifically, the thermoplastic polymer powder can include powder particles with an average particle size from 20 µm to 100 µm. As used herein, "average" with respect to properties of particles refers to a number average unless otherwise specified. Accordingly, "average particle size" refers to a number average particle size. Additionally, "particle size" refers to the diameter of spherical particles, or to the longest dimension of non-spherical particles.

In certain examples, the polymer particles can have a variety of shapes, such as substantially spherical particles or irregularly-shaped particles. In some examples, the polymer powder can be capable of being formed into 3D printed parts with a resolution of 20 to 100 microns. As used herein, "resolution" refers to the size of the smallest feature that can be formed on a 3D printed part. The polymer powder can form layers from about 20 to about 100 microns thick, allowing the fused layers of the printed part to have roughly the same thickness. This can provide a resolution in the z-axis direction of about 20 to about 100 microns. The polymer powder can also have a sufficiently small particle size and sufficiently regular particle shape to provide about 20 to about 100 micron resolution along the x-axis and y-axis.

In some examples, the thermoplastic polymer powder can be colorless. For example, the polymer powder can have a white, translucent, or transparent appearance. When used with a colorless fusing ink, such polymer powders can provide a printed part that can be white, translucent, or transparent. In other examples, the polymer powder can be colored for producing colored parts. In still other examples, when the polymer powder is white, translucent, or transparent, color can be imparted to the part by the fusing ink or another colored ink.

The thermoplastic polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be nylon 6 powder, nylon 9 powder, nylon 11 powder, nylon 12 powder, nylon 66 powder, nylon 612 powder, polyethylene powder, thermoplastic polyurethane powder, polypropylene powder, polyester powder, polycarbonate powder, polyether ketone powder, polyacrylate powder, polystyrene powder, or combinations thereof. In a specific example, the polymer powder can be nylon 12, which can have a melting point from about 175° C. to about 200° C. In another specific example, the polymer powder can be thermoplastic polyurethane.

The thermoplastic polymer powder can also in some cases be blended with a filler. The filler can include inorganic particles such as alumina, silica, or combinations thereof. When the thermoplastic polymer powder fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer powder to filler particles can be from 10:1 to 1:2 or from 5:1 to 1:1.

A variety of fusing inks can also be used to prepare the 3-dimensional printed part. In some examples, the fusing ink can be devoid or substantially devoid of the photoluminescent agent contained in the photoluminescent ink. The fusing ink can contain a fusing agent that is capable of absorbing electromagnetic radiation to produce heat. The fusing agent can be colored or colorless. In various examples, the fusing agent can be carbon black, near-infrared absorbing dyes, near-infrared absorbing pigments, tungsten bronzes, molybdenum bronzes, metal nanoparticles, or combinations thereof.

Examples of near-infrared absorbing dyes include aminium dyes, tetraaryldiamine dyes, cyanine dyes, pthalocyanine dyes, dithiolene dyes, and others. In further examples, the fusing agent can be a near-infrared absorbing conjugated polymer such as poly(3,4-ethylenedioxythiophene)-poly (styrenesulfonate) (PEDOT:PSS), a polythiophene, poly(p-phenylene sulfide), a polyaniline, a poly(pyrrole), a poly (acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the fusing agent can have a peak absorption wavelength in the range of 800 nm to 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, Cu/ZnP$_2$O$_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. The silicates can have the same or similar counterions as the phosphates. One non-limiting example can include M$_2$SiO$_4$, M$_2$Si$_2$O$_6$, and other silicates where M is a counterion having an oxidation state of +2. For example, the silicate M$_2$Si$_2$O$_6$ can include Mg$_2$Si$_2$O$_6$, Mg/CaSi$_2$O$_6$, MgCuSi$_2$O$_6$, Cu$_2$Si$_2$O$_6$, Cu/ZnSi$_2$O$_6$, or other suitable combination of counterions. It is noted that the silicates described herein are not limited to counterions having a +2 oxidation state. Other silicate counterions can also be used to prepare other suitable near-infrared pigments.

The amount of fusing agent in the fusing ink can vary depending on the type of fusing agent. In some examples, the concentration of fusing agent in the fusing ink can be from 0.1 wt % to 20 wt %. In one example, the concentration of fusing agent in the fusing ink can be from 0.1 wt % to 15 wt %. In another example, the concentration can be from 0.1 wt % to 8 wt %. In yet another example, the concentration can be from 0.5 wt % to 2 wt %. In a particular example, the concentration can be from 0.5 wt % to 1.2 wt %.

In some examples, the fusing ink can have a black or gray color due to the use of carbon black as the fusing agent. However, in other examples the fusing ink can be colorless or nearly colorless. The concentration of the fusing agent can be adjusted to provide a fusing ink in which the visible color of the fusing ink is not substantially altered by the fusing agent. Although some of the above described fusing agents can have low absorbance in the visible light range, the absorbance is usually greater than zero. Therefore, the fusing agents can typically absorb some visible light, but their color in the visible spectrum can minimal enough that it does not substantially impact the ink's ability to take on another color when a colorant is added (unlike carbon black which dominates the ink's color with gray or black tones). The fusing agents in concentrated form can have a visible color, but the concentration of the fusing agents in the fusing ink can be adjusted so that the fusing agents are not present in such high amounts that they alter the visible color of the fusing ink. For example, a fusing agent with a very low absorbance of visible light wavelengths can be included in greater concentrations compared to a fusing agent with a relatively higher absorbance of visible light. These concentrations can be adjusted based on a specific application with some experimentation.

In further examples, the concentration of the fusing agent can be high enough that the fusing agent impacts the color of the fusing ink, but low enough that when the ink is printed on the thermoplastic polymer powder, the fusing agent does not impact the color of the powder. The concentration of the fusing agent can be balanced with the amount of fusing ink that is to be printed on the polymer powder so that the total amount of fusing agent that is printed onto the polymer powder can be low enough that the visible color of the polymer powder is not impacted. In one example, the fusing agent can have a concentration in the fusing ink such that after the fusing ink is printed onto the polymer powder, the amount of fusing agent in the polymer powder can be from 0.0003 wt % to 5 wt % with respect to the weight of the polymer powder.

The fusing agent can have a temperature boosting capacity sufficient to increase the temperature of the polymer powder above the melting or softening point of the polymer powder. As used herein, "temperature boosting capacity" refers to the ability of a fusing agent to convert near-infrared light energy into thermal energy to increase the temperature of the printed polymer powder over and above the temperature of the unprinted portion of the polymer powder. Typically, the polymer powder particles can be fused together when the temperature increases to the melting or softening temperature of the polymer. As used herein, "melting point" refers to the temperature at which a polymer transitions from a crystalline phase to a pliable, amorphous phase. Some polymers do not have a melting point, but rather can have a range of temperatures over which the polymers soften. This range can be segregated into a lower softening range, a middle softening range, and an upper softening range. In the lower and middle softening ranges, the particles can coalesce to form a part while the remaining polymer powder remains loose. If the upper softening range is used, the whole powder bed can become a cake. The "softening point," as used herein, refers to the temperature at which the polymer particles coalesce while the remaining powder remains separate and loose. When the fusing ink is printed on a portion of the polymer powder, the fusing agent can heat the printed portion to a temperature at or above the melting or softening point, while the unprinted portions of the polymer powder remain below the melting or softening point. This allows the formation of a solid 3D printed part, while the loose powder can be easily separated from the finished printed part.

Although melting point and softening point are often described herein as the temperatures for coalescing the polymer powder, in some cases the polymer particles can coalesce together at temperatures slightly below the melting point or softening point. Therefore, as used herein "melting point" and "softening point" can include temperatures slightly lower, such as up to about 20° C. lower, than the actual melting point or softening point.

In one example, the fusing agent can have a temperature boosting capacity from about 10° C. to about 70° C. for a polymer with a melting or softening point from about 100° C. to about 350° C. If the powder bed is at a temperature within about 10° C. to about 70° C. of the melting or softening point, then such a fusing agent can boost the temperature of the printed powder up to the melting or softening point, while the unprinted powder remains at a lower temperature. In some examples, the powder bed can be preheated to a temperature from about 10° C. to about 70° C. lower than the melting or softening point of the polymer. The fusing ink can then be printed onto the powder and the powder bed can be irradiated with a near-infrared light to coalesce the printed portion of the powder.

In further examples, colored inks can also be used for adding color to the thermoplastic polymer powder. The colored inks can include any suitable pigment or dye. This can allow for printing of full-color 3-dimensional parts. In one specific example, the colored ink can include a cyan, magenta, yellow, or black ink. Alternatively, a colorant can be added to any of the other inks used to prepare the 3-dimensional printed part.

A variety of photoluminescent inks can also be used to print a subsurface security feature in the 3-dimensional printed part. The photoluminescent ink can include a photoluminescent agent. Any jettable photoluminescent agent can be used. A photoluminescent agent can be any agent that exhibits photoluminescence. "Photoluminescence," as used herein, refers to an emission of light by a substance as a result of the absorbance of a photon by that substance. More specifically, absorption of a photon by a photoluminescent agent can induce photoexcitation of the photoluminescent agent. Photoexcitation refers to the excitation of electrons within the photoluminescent agent due to the absorption of the photon. The photoexcitation of the photoluminescent agent can be followed by a relaxation event, where the excited electrons relax back to a lower energy state. The relaxation of the excited electrons can be accompanied by the emission of a photon from the photoluminescent agent. Typically, the photoluminescent agent can absorb photons at a different wavelength of electromagnetic radiation than the wavelength of the emitted photon.

As such, in some examples, these photoluminescent agents can be "tuned" to photoexcite at wavelengths outside of the visible spectrum, such as within the Ultraviolet (UV) range or the infrared (IR) range, and to photoluminesce within the visible range. In other examples, the photoluminescent agent can be "tuned" to photoexcite at one wavelength within the visible range and to emit at a different wavelength within the visible range.

Non-limiting examples of photoluminescent agents can include a photoluminescent pigment, a photoluminescent dye, a quantum dot, the like, or combinations thereof. In some examples, the photoluminescent agent can include a fluorescent agent, a phosphorescent agent, or a combination thereof. In some examples, photoluminescent dyes can be enclosed within, distributed throughout, or otherwise associated with a microparticle or nanoparticle. In some examples, photoluminescent pigments can include a photoluminescent nanoparticle and/or a photoluminescent microparticle. For example, a photoluminescent pigment or dye can be coupled to a surface of a microparticle or nanoparticle, embedded within the microparticle or nanoparticle, distributed throughout the microparticle or nanoparticle, or otherwise associated with a microparticle or nanoparticle. As used herein, "microparticle" refers to a particle having a particle size of about 100 nm to about 100 µm. As used herein, "nanoparticle" refers to a particle having a particle size of about 1 nm to about 100 nm.

Numerous photoluminescent pigments and/or dyes can be used. Non-limiting examples can include europium doped strontium aluminates, thallium doped sodium iodides, activated alkaline earth metal sulfides, activated alkaline earth metal silicates, rhodamines, acridines, fluorines, cyanines, oxazines, phenanthridines, pyrrolopyrroles, benzoxazoles, benzothiazoles, azo pigments, azo-metal complexes, bisacetoacetarylides, azomethines, arylmethines, benzimidazolones, diazopyrazolones, quinacridones, quinones, flavanthrones, perinones, isoindolines, isoindolinones, perylenes, phthalocyanines, metal-phthalocyanine complexes, porphyrins, metal-porphyrin complexes, polyenes, polymethines, squaraines, or combinations thereof. In one specific example, a photoluminescent dye can be fluorescein. In another specific example, a photoluminescent dye can be rhodamine B. As previously described, dyes or pigments can be associated with microparticles or nanoparticles. Non-limiting commercially available examples can include Fluoresbrite® microspheres, such as YG Carboxylate Microspheres, YO Carboxylate Microspheres, NYO Carboxylate Microspheres, BB Carboxylate Microspheres, and EU Carboxylate Microspheres available from Polysciences, Inc.

Where the photoluminescent agent is a particulate photoluminescent agent (e.g., a photoluminescent pigment, photoluminescent nanoparticle, etc.), the photoluminescent agent can have a particle size from about 10 nm to about 400 nm or 500 nm, or from about 20 nm to about 200 nm or 300 nm, or from about 30 nm to about 70 nm or 120 nm.

Quantum dots can also be used as a photoluminescent agent. Quantum dots can be very small semiconductor particles that typically have a particle size of about 20 nm or less. Quantum dots can be made of a variety of semiconductor materials. For example, quantum dots can be made of a single element, such as silicon, germanium, and the like. Alternatively, quantum dots can be compounds of materials, such as indium phosphide, indium arsenide, zinc sulfide, lead sulfide, cadmium sulfide, lead selenide, cadmium selenide, the like, or combinations thereof. Other quantum dots that can be used include I-III-VI quantum dots, including, for example $CuInS_x$ or $CuInSe_x$ quantum dots, where x may be 1 or 2. Non-limiting commercially available quantum dots can include Indium Phosphide Zinc Sulfide Quantum Dots in Water and Cadmium Selenide Zinc Sulfide Quantum Dots in Water from NN-Labs, and NanoDOT™ CIS-500 and NanoDOT™ CIS-700 from Voxtel, Inc.

Quantum dots can be prepared in a number of ways. For example, the quantum dots can be made of a single component with uniform composition throughout (e.g., silicone, zinc sulfide, etc.). The photoluminescence of these quantum dots can be tunable merely by adjusting the size of the quantum dot. In other examples, the quantum dots can be prepared with a core material having a lower band gap surrounded by a shell material having a higher band gap. As one example, the core material can be cadmium selenide and the shell material can be zinc sulfide. The photoluminescence of these quantum dots can be tunable based on both particle size and the specific combination of core and/or shell materials. In other examples, the quantum dots can be prepared by alloying different quantum dots particles together, such as indium phosphide and zinc sulfide, or cadmium selenide and zinc sulfide, or any other suitable alloy of quantum dot particles. These quantum dots can also be tuned based on both size and the specific alloy used.

As previously described, quantum dots can typically have a particle size of about 20 nm or less. Generally, the larger the particle size of the quantum dot, the longer the photoluminescent emission wavelength will be. Conversely, the smaller the particle size of the quantum dot, the shorter the photoluminescent emission wavelength will be. In some examples, the quantum dots can have a particle size from about 2 nm to about 10 nm. In other examples, the quantum dots can have a particle size from about 4 nm to about 8 nm. In other examples, the quantum dots can have a particle size from about 8 nm to about 14 nm.

The amount of photoluminescent agent in the photoluminescent ink can vary depending on the type of photoluminescent agent. In some examples, the concentration of photoluminescent agent in the photoluminescent ink can be from 0.01 wt % to 10 wt %. In one example, the concentration of photoluminescent agent in the photoluminescent ink can be from 0.05 wt % to 8 wt %. In another example, the concentration can be from 0.1 wt % to 5 wt %. In yet another example, the concentration can be from 0.1 wt % to 3 wt %. In a particular example, the concentration can be from 0.5 wt % to 1.5 wt %.

Figure 7:
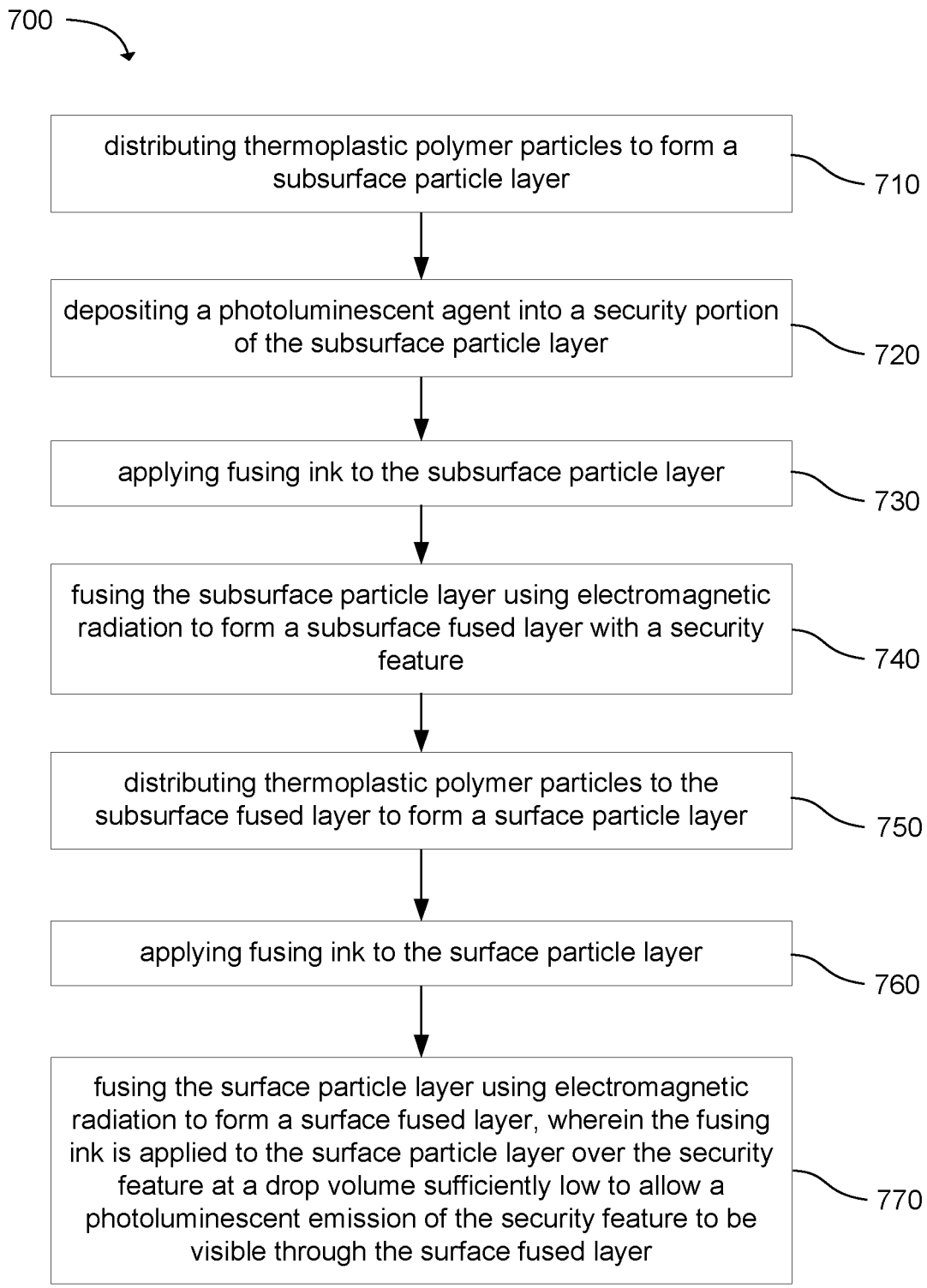
FIG. 7 is a flow chart representing a method of making a 3-dimensional printed part in accordance with examples of the present disclosure.

In addition to the 3-dimensional parts described herein, the present disclosure includes a method 700 of making a 3-dimensional printed part, as depicted in FIG. 7. The method can include distributing 710 thermoplastic polymer powder to form a subsurface particle layer, depositing 720 a photoluminescent agent into a security portion of the subsurface particle layer, applying 730 a fusing ink to the subsurface particle layer, and fusing 740 the subsurface particle layer using electromagnetic radiation to form a subsurface fused layer with a security feature. The method can also include distributing 750 thermoplastic polymer powder to the subsurface fused layer to form a surface particle layer, applying 760 fusing ink to the surface particle layer, and fusing 770 the surface particle layer using electromagnetic radiation to form a surface fused layer, wherein the fusing ink is applied to the surface particle layer over the security feature at a drop volume sufficiently low to allow a photoluminescent emission of the security feature to be visible through the surface fused layer.

As mentioned, details described above related to the 3-dimensional printed part can be relevant to the present method. For example, the security feature can be formed at a single layer of distributed thermoplastic polymer powder or across a plurality of layers of distributed thermoplastic polymer powder. In some cases it can be desirable that the security feature be thicker than a single layer of distributed thermoplastic polymer powder. In such cases, the security feature can be formed across a plurality of layers to achieve a desired thickness. In other examples, the security feature can be printed in an orientation (such as a complete or partial z-axis orientation) that can benefit from or require additive layers of thermoplastic polymer powder to complete the printing of the security feature.

Further, depositing the photoluminescent agent into the security portion of the subsurface particle layer can be performed simultaneously with or separately from applying fusing ink to the subsurface particle layer. Thus, in some examples, the step of depositing the photoluminescent agent into the security portion of the subsurface particle layer and the step of applying fusing ink to the subsurface particle layer can be carried out using a single fluid. In other examples, the step of depositing the photoluminescent agent into the security portion of the subsurface particle layer and the step of applying fusing ink to the subsurface particle layer can be carried out using two separate fluids. Where two separate fluids are used, in some examples, the step of depositing the photoluminescent agent into the security portion of the subsurface particle layer can be performed before the step of applying fusing ink to the subsurface particle layer. In other examples, where two separate fluids are used, the step of depositing the photoluminescent agent into the security portion of the subsurface particle layer can be performed after the step of applying fusing ink to the subsurface particle layer.

As previously mentioned, the surface layer can likewise be formed of a single layer of fused thermoplastic polymer powder or of a plurality of additive layers of thermoplastic polymer powder, depending on position and orientation of the security feature, thickness of the surface layer, etc. In some examples, the entire surface layer can include a masking feature through which a subsurface security feature can be visible. In other examples, the surface layer can include an isolated area or areas that can be masking features. Thus, in some examples, the surface fused layer can include a masking area and a non-masking area. The masking area can be positioned over the security feature and can be prepared by applying a lower drop volume of fusing agent to the area of the surface particle layer corresponding to the masking area compared to a higher drop volume applied to non-masking areas.

In other examples, a second fusing ink that is less attenuating of electromagnetic radiation can be applied to the masking area. In some examples, the second fusing ink can be less attenuating of electromagnetic radiation because of a reduced concentration of the fusing agent in the second fusing ink, because the second fusing ink includes a second fusing agent that is less attenuating of electromagnetic radiation than the fusing agent in the fusing ink applied to non-masking areas, or a combination thereof. Where the second fusing ink includes a second fusing agent that is less attenuating of electromagnetic radiation than the fusing agent applied to the non-masking area, the second fusing ink can be applied at a lower drop volume, an equivalent drop volume, or a greater drop volume as compared to the fusing ink applied to the non-masking area. The drop volume of the second fusing ink can depend on the temperature boosting capacity of the fusing agent in the second fusing ink, the concentration of the fusing agent in the second fusing ink, the desired attenuation of electromagnetic radiation, etc.

As described herein, the masking area can be an area of decreased attenuation of electromagnetic radiation at a specific wavelength or range of wavelengths as compared to a non-masking area. In some examples, the masking area can provide a translucent window through which a photoluminescent emission of the security feature can be visible. The degree of translucency can be adjusted based on a desired photoluminescent property of the 3-dimensional printed part. For example, where the security feature is printed with a greater amount of photoluminescent agent, the masking feature can be less translucent and still allow sufficient photoexcitation of the security feature to facilitate sufficient visibility of the security feature during a photoluminescent event. Where the security feature is printed with a lower amount of photoluminescent agent, the masking feature can be more translucent to facilitate increased photoexcitation of the security feature and increased visibility of the photoluminescent security feature through the fused surface layer.

Figure 8:
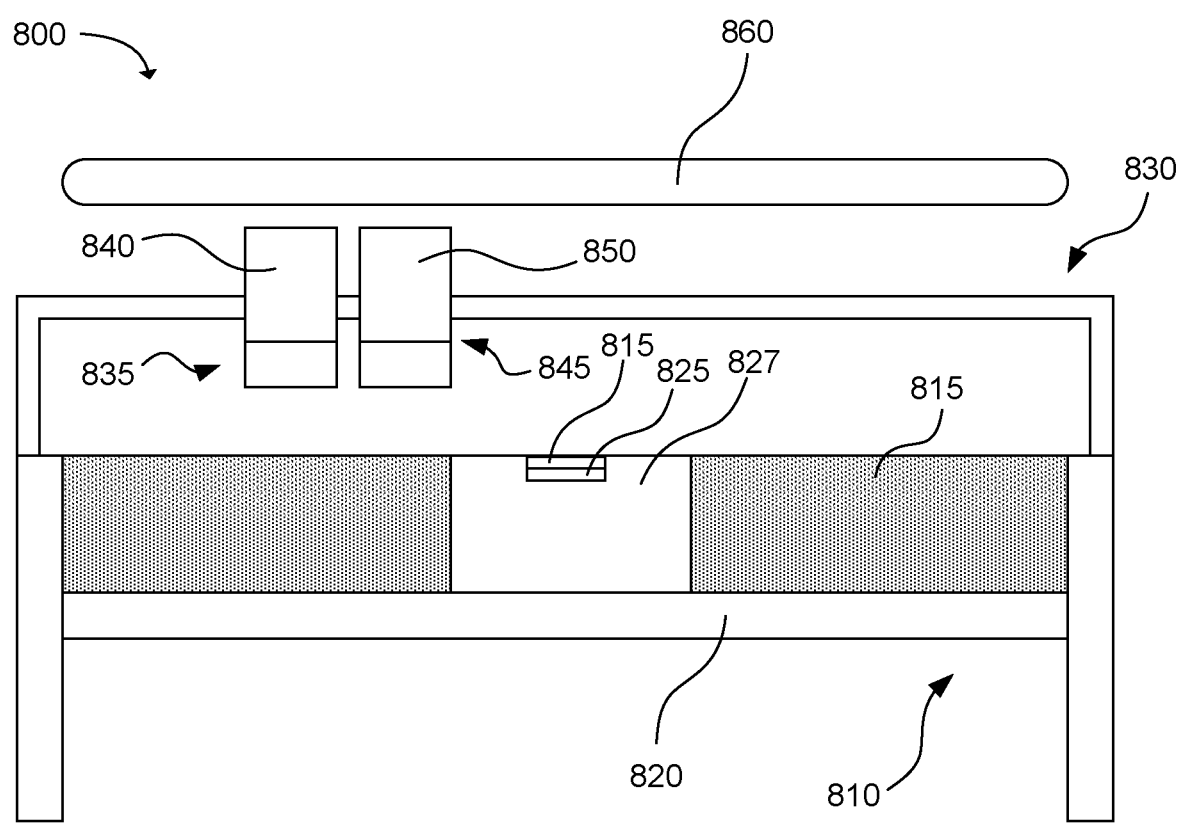
FIG. 8 is a schematic view of a 3-dimensional printing system in accordance with examples of the present disclosure.

In addition to the 3-dimensional printed parts described above, the present technology also encompasses 3-dimensional printing systems that can be used to print the 3-dimensional printed parts. An example of a 3-dimensional printing system 800 is shown in FIG. 8. The system includes a powder bed 810 including a thermoplastic polymer powder 815 having an average particle size from 20 μm to 100 μm. In the example shown, the powder bed has a moveable floor 820 that allows the powder bed to be lowered after each layer of the 3-dimensional part is printed. The 3-dimensional part can include a photoluminescent security feature 825, a part body 827, and a masking region or feature 815, as described herein. The system also includes an inkjet printer 830 that includes a first inkjet pen 835 in communication with a reservoir of a photoluminescent ink 840. The first inkjet pen can print the photoluminescent ink onto the powder bed. The photoluminescent ink can include a photoluminescent agent. A second inkjet pen 845 is in communication with a reservoir of a fusing ink 850 to print the fusing ink onto the powder bed. The fusing ink can include a fusing agent capable of absorbing electromagnetic radiation to produce heat. The second inkjet pen can decrease an amount of fusing ink printed to portions of the powder bed adjacent to areas printed with the photoluminescent ink. After the fusing ink has been printed onto the powder bed, a fusing lamp 860 can be used to expose the powder bed to electromagnetic radiation sufficient to fuse the thermoplastic polymer powder that has been printed with the photoluminescent ink, the fusing ink, or both. As mentioned, details described above related to the 3-dimensional printed part can be relevant to the present method.

In some examples, the 3-dimensional printing system can also include a third inkjet pen in communication with a reservoir of colored ink to print the colored ink onto the powder bed. In further examples, the 3-dimensional printing system can include additional inkjet pens for additional photoluminescent inks, additional fusing inks, additional colored inks, or other suitable inks.

To achieve selectivity between the fused and unfused portions of the powder bed, the fusing inks can absorb enough energy to boost the temperature of the thermoplastic polymer powder above the melting or softening point of the polymer, while unprinted portions of the powder bed remain below the melting or softening point. In some examples, the 3-dimensional printing system can include preheaters for preheating the thermoplastic polymer powder to a temperature near the melting or softening point. In one example, the system can include a print bed heater to heat the print bed during printing. The preheat temperature used can depend on the type of thermoplastic polymer used. In some examples, the print bed heater can heat the print bed to a temperature from 130° C. to 160° C. The system can also include a supply bed, where polymer particles can be stored before being spread in a layer onto the print bed. The supply bed can have a supply bed heater. In some examples, the supply bed heater can heat the supply bed to a temperature from 90° C. to 140° C.

Suitable fusing lamps for use in the 3-dimensional printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce each printed layer. In some examples, the fusing lamp can irradiate the entire powder bed with a substantially uniform amount of energy. This can selectively coalesce the printed portions with fusing inks leaving the unprinted portions of the polymer powder below the melting or softening point.

In one example, the fusing lamp can be matched with the fusing agents in the fusing inks so that the fusing lamp emits wavelengths of light that match the peak absorption wavelengths of the fusing agents. A fusing agent with a narrow peak at a particular near-infrared wavelength can be used with a fusing lamp that emits a narrow range of wavelengths at approximately the peak wavelength of the fusing agent. Similarly, a fusing agent that absorbs a broad range of near-infrared wavelengths can be used with a fusing lamp that emits a broad range of wavelengths. Matching the fusing agent and the fusing lamp in this way can increase the efficiency of coalescing the polymer particles with the fusing agent printed thereon, while the unprinted polymer particles do not absorb as much light and remain at a lower temperature.

Depending on the amount of fusing agent present in the polymer powder, the absorbance of the fusing agent, the preheat temperature, and the melting or softening point of the polymer, an appropriate amount of irradiation can be supplied from the fusing lamp. In some examples, the fusing lamp can irradiate each layer so as to fuse the thermoplastic polymer powder within about 0.5 to about 10 seconds after initial exposure.

It is noted that, as used in this specification and the appended claims, the singular forms "a," "an," and "the" include plural referents unless the context clearly dictates otherwise.

As used herein, "liquid vehicle" or "ink vehicle" refers to a liquid fluid in which additives are placed to form inkjettable fluids, such as inks. A wide variety of liquid vehicles may be used in accordance with the technology of the present disclosure. Such liquid or ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants and fusing agents, the liquid vehicle can carry solid additives such as polymers, latexes, UV curable materials, plasticizers, salts, etc.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific aspect, however, the pigment is a pigment colorant.

As used herein, "soluble," refers to a solubility percentage of more than 0.1 wt %.

As used herein, "ink jetting" or "jetting" refers to compositions that are ejected from jetting architecture, such as ink-jet architecture. Ink-jet architecture can include thermal or piezo architecture. Additionally, such architecture can print varying drop sizes such as less than 10 picoliters, less than 20 picoliters, less than 30 picoliters, less than 40 picoliters, less than 50 picoliters, etc.

The terms "surface particle layer" or "surface fused layer" does not necessarily mean that this layer is at the outermost surface of the 3-dimensional part, but rather is meant to be the defined as the outermost layer printed using the powder and fusible inks additive process of the present disclosure, or if in the form of multiple thinner layers, that the cumulative thickness of the surface fused layer be less than 150 µm. Furthermore, if a 3-dimensional printed part were to be coated with a clear coat or other coating not prepared using the additive manufacturing described herein, that would not be considered to be the "surface particle layer" or "surface fused layer." These terms are meant to mean the "surface" layer(s) printed using the additive powder and fusible ink layering described herein.

The term "thermoplastic polymer powder" refers to relatively fine thermoplastic particles with an average particle size from 20 µm to 100 µm. The thermoplastic polymer powder can have a melting or softening point from about 70° C. to about 350° C., and can include polymers such as nylons or polyamides, polyethylenes, thermoplastic polyurethanes, polypropylenes, polyesters, polycarbonates, polyether ketones, polyacrylates, polystyrenes, etc. The term "powder" can be used interchangeably with "particle" or "particulate."

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLE

The following illustrates an example of the present disclosure. However, it is to be understood that the following is only illustrative of the application of the principles of the present disclosure. Numerous modifications and alternative compositions, methods, and systems may be devised without departing from the spirit and scope of the present disclosure. The appended claims are intended to cover such modifications and arrangements.

In accordance with an example of the present disclosure, a 3-dimensional printing system can be used to print various 3-dimensional printed parts having a photoluminescent security feature encapsulated within the part body beneath a surface layer. Specifically, photoluminescent inks and fusing inks were printed from separate ink jet pens. The photoluminescent inks used had formulations as follows:

| Ink #1 - 3.0% Fluorescein | |
|---|---|
| Component | Weight (g) for 25 g Ink |
| Water | 18.31 |
| Organic Co-solvent Vehicle | 5.94 |
| Fluorescein, Na+ salt | 0.75 |

| Ink #2 - 0.5% Rhodamine B | |
|---|---|
| Component | Weight (g) for 25 g Ink |
| Water | 18.94 |
| Organic Co-solvent Vehicle | 5.94 |
| Rhodamine B | 0.13 |

| Ink #3 - 3.0% Fluorescein | |
|---|---|
| Component | Weight (g) for 25 g Ink |
| Water | 18.46 |
| Organic Co-solvent Vehicle | 5.75 |
| Non-ionic Wetting Agent | 0.04 |
| Fluorescein, Na+ salt | 0.75 |

| Ink #4 - 0.5% Rhodamine B | |
|---|---|
| Component | Weight (g) for 25 g Ink |
| Water | 19.09 |
| Organic Co-solvent Vehicle | 5.75 |
| Non-ionic Wetting Agent | 0.04 |
| Rhodamine B | 0.13 |

The fusing ink was formulated as follows:

| Components in ink formulation | Weight % of component | Weight for 10 kg Ink (g) |
|---|---|---|
| Organic Co-solvent Vehicle | 20.00 | 2000.00 |
| Anionic Surfactant | 0.50 | 50.00 |
| Nonionic Surfactants | 0.8 | 80.00 |
| Polymer Dispersant | 0.01 | 1.00 |
| Chelating Agent | 0.04 | 4.00 |
| Biocides | 0.32 | 32.00 |
| Carbon black | 5.00 | 2500.00 |
| DI Water | 73.33 | 5333.00 |
| Total Fluid | | 10000.00 |

The inks were jetted onto a bed of nylon (PA12) particles (Vestosint® x1556, available from Evonik). The nylon particles had an average particle size of approximately 50 µm. The layer thickness was approximately 100 µm. Each 3-dimensional printed part was printed with a subsurface particle layer having a security feature. On these layers the photoluminescent ink was printed into a security area to form the security feature using a contone level of 255, a print resolution of 1200×1200, and a drop weight of 9 ng to achieve a print density of about 1 mg solids/cubic centimeter (cc) for the rhodamine B inks and about 6 mg solids/cc for the fluorescein inks. The fusing ink was printed in both the security area and non-security areas of the subsurface particle layer using a contone level of 80, a resolution of 1200×1200, and a drop weight of 11.5 ng to achieve a print density of about 4 mg solids/cc. A single pass of each of the inks was performed for the photoluminescent composite layer. After the single pass, a curing pass was performed.

A surface particle layer was printed on top of the subsurface fused layer. The surface particle layer included a masking area or feature printed over the subsurface security feature, as well as non-masking areas. The non-masking areas of the surface particle layer were prepared in the same manner as the non-security areas of the subsurface particle layer. The masking area was printed by reducing the contone level of the fusing ink to 40, while using the same resolution and drop weight as in other areas. This was sufficient to decrease the print density in the masking area to about 2 mg solids/cc.

The printer powder supply and powder bed were filled with the nylon particles. The supply temperature was set at 110° C. and the print bed temperature was set at 130° C. A heater under the print bed was set at 150° C. The print speed was set at 10 inches per second (ips) and the cure speed was set at 7 ips. Curing was performed using two 300 W bulbs placed approximately 1 cm away from the surface of the powder bed.

The security features encapsulated within the 3-dimensional printed parts were unobservable under ambient lighting. However, under UV irradiation, the photoluminescent emission from the photoluminescent features became reasonably visible in ambient lighting. However, using UV irradiation in a dark room resulted in a very prominent photoluminescent security feature that was visible through the masking area.

What is claimed is:

1. A 3-dimensional printed part, comprising:
    a part body comprising a first matrix of fusing agent and thermoplastic polymer powder;
    a security feature comprising a second matrix of fusing agent, thermoplastic polymer powder, and a quantum dot photoluminescent agent; and
    a masking feature comprising a third matrix of fusing agent and thermoplastic polymer powder,
    wherein the security feature is positioned beneath and visible through the masking feature upon photoluminescent emission of the security feature.

2. The 3-dimensional printed part of claim 1, wherein the third matrix has a lower concentration of fusing agent than the first matrix.

3. The 3-dimensional printed part of claim 1, wherein the security feature is encapsulated between the part body and the masking feature, and wherein the masking feature forms a portion of an exterior surface of the 3-dimensional printed part through which a photoluminescent emission of the security feature is visible.

4. The 3-dimensional printed part of claim 1, wherein the security feature absorbs electromagnetic radiation at a wavelength less than 302 nm or greater than 700 nm to generate a photoluminescent emission at a wavelength from 302 nm to 700 nm.

5. The 3-dimensional printed part of claim 1, wherein the security feature is printed at a depth of from 20 µm to 150 µm from an exterior surface of the 3-dimensioal printed part.

6. The 3-dimensional printed part of claim 1, wherein the fusing agent is a carbon black, a near-infrared absorbing dye, a near-infrared absorbing pigment, a tungsten bronze, a molybdenum bronze, metal nanoparticles, a conjugated polymer, or a combination thereof.

7. The 3-dimensional printed part of claim 1, wherein the thermoplastic polymer powder is a nylon, a thermoplastic elastomer, a urethane, a polycarbonate, a polystyrene, or a combination thereof.

8. A method of making a 3-dimensional printed part, the method comprising:
    distributing thermoplastic polymer powder to form a subsurface particle layer;
    depositing a photoluminescent agent into a security portion of the subsurface particle layer;
    applying a fusing ink to the subsurface particle layer;
    fusing the subsurface particle layer using electromagnetic radiation to form a subsurface fused layer with a security feature;
    distributing thermoplastic polymer powder to the subsurface fused layer to form a surface particle layer;
    applying the fusing ink to the surface particle layer; and
    fusing the surface particle layer using electromagnetic radiation to form a surface fused layer, wherein the fusing ink is applied to the surface particle layer over the security feature at a drop volume sufficiently low to allow a photoluminescent emission of the security feature to be visible through the surface fused layer.

9. The method of claim 8, wherein the surface fused layer includes a masking area and a non-masking area, wherein the masking area is positioned over the security feature, and wherein the masking area is prepared by applying a lower drop volume of fusing agent to the surface particle layer corresponding to the masking area compared to a higher drop volume applied to non-masking areas.

10. The method of claim 9, wherein the masking area provides a translucent window through which photoluminescent emission of the security feature is visible.

11. The method of claim 8, wherein the step of depositing the photoluminescent agent into the security portion of the subsurface particle layer and the step of applying fusing ink to the subsurface particle layer is carried out using two separate fluids.

12. The method of claim 8, wherein the step of depositing the photoluminescent agent and the steps of applying the fusing ink are each performed with an inkjet print head.

* * * * *